US010652344B2

(12) United States Patent
Bejerasco et al.

(10) Patent No.: US 10,652,344 B2
(45) Date of Patent: May 12, 2020

(54) METHOD FOR PRIVACY PROTECTION

(71) Applicant: F-Secure Corporation, Helsinki (FI)

(72) Inventors: Christine Bejerasco, Espoo (FI);
Karmina Aquino, Espoo (FI); Heikki Hannikainen, Helsinki (FI)

(73) Assignee: F-SECURE CORPORATION, Helsinki (FI)

( * ) Notice: Subject to any disclaimer, the term of this patent is extended or adjusted under 35 U.S.C. 154(b) by 37 days.

(21) Appl. No.: 15/284,771

(22) Filed: Oct. 4, 2016

(65) Prior Publication Data

US 2017/0099359 A1      Apr. 6, 2017

(51) Int. Cl.
*H04L 29/08* (2006.01)
*G06F 21/62* (2013.01)
*G06F 16/951* (2019.01)
*G06F 16/955* (2019.01)

(52) U.S. Cl.
CPC .......... *H04L 67/22* (2013.01); *G06F 16/951* (2019.01); *G06F 16/955* (2019.01); *G06F 21/6245* (2013.01); *G06F 21/6263* (2013.01); *H04L 67/02* (2013.01)

(58) Field of Classification Search
CPC ... H04L 67/22; H04L 67/02; G06F 17/30864; G06F 17/30876; G06F 21/6245; G06F 21/6262
See application file for complete search history.

(56) References Cited

U.S. PATENT DOCUMENTS

| 6,018,619    | A    | *  | 1/2000  | Allard      | H04L 29/06    |
|              |      |    |         |             | 709/211       |
| 6,947,984    | B2   | *  | 9/2005  | Schweitzer  | H04M 15/31    |
|              |      |    |         |             | 709/224       |
| 7,996,912    | B2   | *  | 8/2011  | Spalink     | G06F 21/6254  |
|              |      |    |         |             | 705/74        |
| 9,060,031    | B1   | *  | 6/2015  | Taylor      | H04L 67/2814  |
| 9,219,787    | B1   | *  | 12/2015 | Manion      | H04L 67/142   |
| 9,553,918    | B1   | *  | 1/2017  | Manion      | G06F 16/00    |
| 9,602,992    | B2   | *  | 3/2017  | Libonate    | H04W 8/18     |
| 9,674,129    | B1   | *  | 6/2017  | Everton     | H04L 51/18    |
| 9,703,988    | B1   | *  | 7/2017  | Sudbury     | G06F 21/6263  |
| 2007/0279674 | A1   | *  | 12/2007 | Oomura      | G06F 21/608   |
|              |      |    |         |             | 358/1.14      |
| 2008/0270417 | A1   | *  | 10/2008 | Roker       | G06Q 30/02    |

(Continued)

OTHER PUBLICATIONS

Combined Search and Examination Report under Sections 17 and 18(3) issued by the United Kingdom Intellectual Property Office in connection with GB 1517511.0 dated Jun. 14, 2016 (6 pages).

*Primary Examiner* — Uzma Alam
(74) *Attorney, Agent, or Firm* — Robert P. Michal, Esq.; Carter, DeLuca & Farrell LLP

(57) ABSTRACT

There is provided a method for privacy protection including: intercepting at least part of network traffic from a client device; analysing network traffic data of the intercepted network traffic to identify any elements indicative of a website visitor tracking process; analysing the one or more elements indicative of the website visitor tracking process to identify any tracking fields comprising user specific data; selecting random tracking field data accepted by the website visitor tracking process and replacing the user specific data of the one or more tracking fields with the selected random tracking field data respectively.

14 Claims, 5 Drawing Sheets

---

700. Client device/server intercepts network traffic

702. Client/server analyses data to identify elements indicative of website visitor tracking process 704. Client/server identifies tracking fields comprising user specific data based on analysis of identified elements indicative of website visitor tracking process 706. Client/server selects random data related to the tracking fields accepted by website visitor tracking process 708. Client/server replaces user specific data of tracking field(s) with selected random tracking field data

(56) References Cited

U.S. PATENT DOCUMENTS

| | | | |
|---|---|---|---|
| 2011/0208850 A1* | 8/2011 | Sheleheda | G06F 16/9535 709/223 |
| 2016/0148006 A1* | 5/2016 | Ganapathi | G06F 21/62 726/30 |
| 2016/0226832 A1* | 8/2016 | Garreau | H04L 67/02 |

* cited by examiner

METHOD FOR PRIVACY PROTECTION

CROSS-REFERENCE TO RELATED APPLICATIONS

The present application claims priority under 35 USC 119 to Great Britain Patent Application Serial No. GB 1517511.0, filed Oct. 5, 2015, the entire disclosure of which is incorporated herein by reference.

TECHNICAL FIELD

The exemplary and non-limiting embodiments of the present application are related generally to methods, apparatuses and computer programs and, more specifically, to the field of controlling access to web resources.

BACKGROUND

Website visitor tracking is used to analyse visitor behaviour on a website. The use of tracking can be controversial when this relates to private individuals. The problems with over tracking are clear: excessive tracking wastes time and bandwidth: third-party trackers follow individuals around the web wherever they go and it is not clear to everyone how companies really use the data they acquire by tracking, where is it stored and who has access to it.

There are already different ways to block tracking. However, really sophisticated trackers are persistent enough to find another way to extract the data content they want. Being bombarded with these more persistent tracking URLs when the initial tracking URL was blocked and did not return to the tracking server is becoming more and more common. Eventually, after all the persistent methods have been used, the remote tracking server will still have an accurate tracking profile of the user. Blocking tracking cookies altogether may also cause other problems. For example, certain webpages may only load properly when the tracking information was properly sent and received by a tracking server. One attempt to solve problems with tracking is to send random cookie data to the tracking servers instead of blocking cookie sending. However, sophisticated tracking servers are able to detect fake data that is not being expected.

There is a need for protecting user privacy so as to make the online experience of the user still smooth while tracking is available and for example cookies can still be used while at the same time user's privacy is kept safe and any data received by tracking servers can no longer be correctly linked to the user.

SUMMARY

Various aspects of examples of the invention are set out in the claims.

According to an aspect of the invention, there is provided a method as specified in claim 1.

According to an aspect of the invention, there is provided an apparatus as specified in claim 8.

According to an aspect of the invention, there is provided an apparatus comprising processing means configured to cause the apparatus to perform any of the embodiments as described in the appended claims.

According to an aspect of the invention, there is provided an apparatus comprising a processing system configured to cause the apparatus to perform any of the embodiments as described in the appended claims.

According to an aspect of the invention, there is provided an apparatus comprising means for performing any of the embodiments as described in the appended claims.

Embodiments of the invention are defined in the depended claims.

BRIEF DESCRIPTION OF THE DRAWINGS

The accompanying drawings provide a more complete understanding of the embodiments of the present invention according to the following descriptions.

DETAILED DESCRIPTION

The present invention can apply to any processing system, terminal, server, corresponding component, or to any computer system or combination of different communications systems that support the required functionality. Due to the rapid development of the specifications of computer systems and protocols that are used, all words and expressions should be interpreted broadly; they are intended only to illustrate the embodiment.

Figure 1:
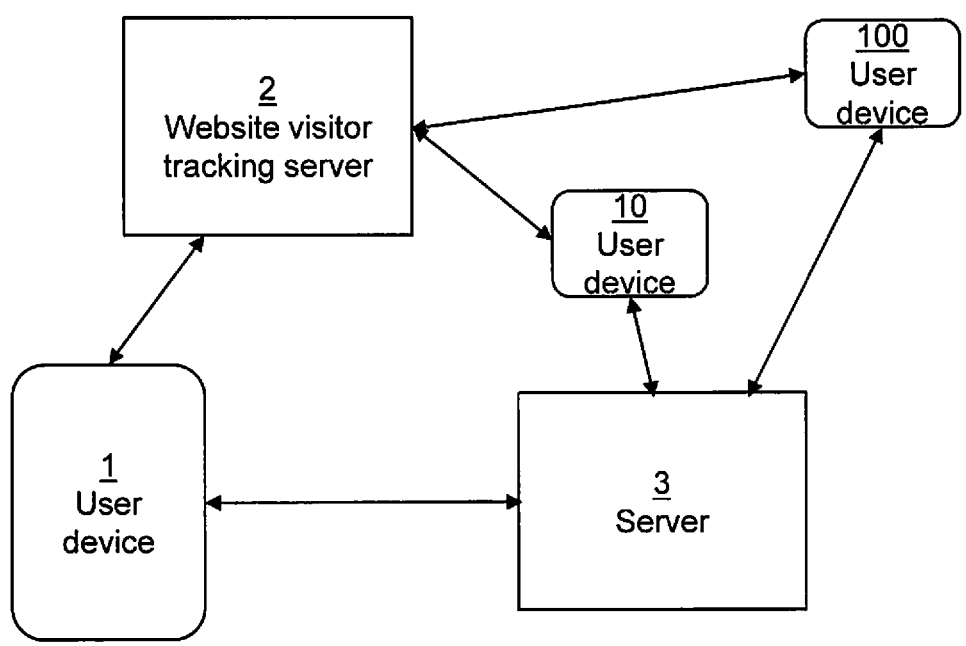
FIG. 1 illustrates schematically in a block diagram an exemplary network architecture.
Figure 4:
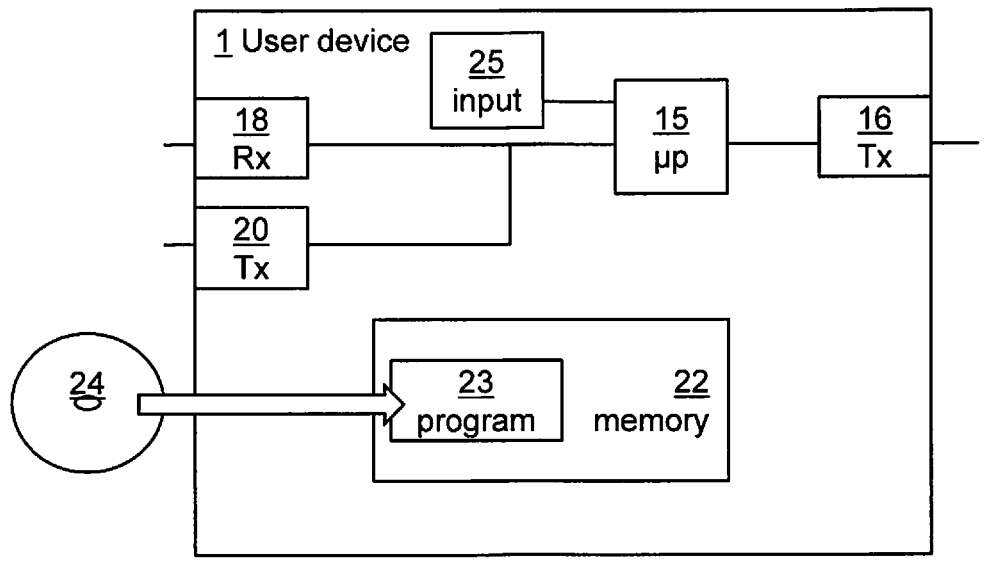
FIG. 4 illustrates schematically in a block diagram a user device.
Figure 5:
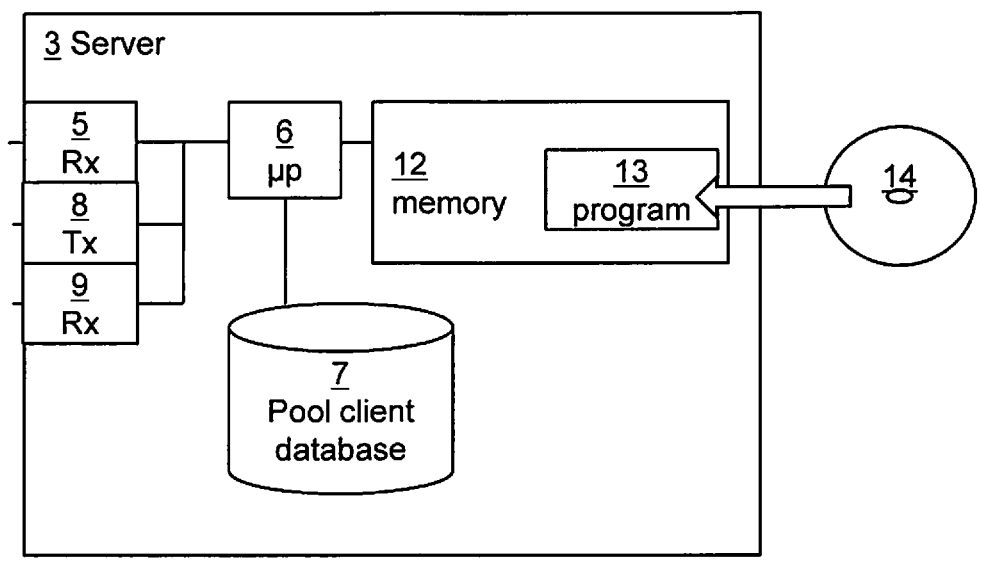
FIG. 5 illustrates schematically in a block diagram a server.

FIGS. 1, 4 and 5 illustrate general examples of apparatuses in which the embodiments of the invention may be applied. It only shows the elements and functional entities that are required for understanding the arrangement according to an embodiment of the invention. Other components have been omitted for the sake of simplicity. The implementation of the elements and functional entities may vary from that shown in the figures. The connections shown are logical connections and the actual physical connections may be different. It is apparent to a person skilled in the field that the arrangement may also comprise other functions and structures. For example, the functional entities of the user device 1 may physically reside in separate locations also. Some or part of the device processes may be implemented using cloud computing in which resources are provided to a local client on an on-demand basis, usually by means of the Internet.

FIG. 1 shows a simple network architecture in which user devices 1, 10, 100, such as personal computers, smartphones, mobile phones, laptops or tablets, are in communication with other network elements such as web resources 2 in the Internet. A web resource may refer to targets of uniform resource locators (URLs) but may also be a referent of any uniform resource identifier or internationalized resource identifier. The web resource may comprise every 'thing' or entity that can be identified, named, addressed or handled, in any way, in the web at large, or in any network information system. The user devices 1, 10, 100 are in communication with a reputation server 3 and can also connect to other data sources. The devices may connect by any suitable communications network, for example via the Internet.

Tracking is enabled by using data from client-side cookies or from other data elements that are read by different visitor tracking websites/servers for different reasons. A cookie is a small piece of data that is placed on the user device by a website that is visited. For example, every time the user device loads a certain website, the browser sends the cookie back to the server to notify the website of the user's activity. Cookies can store passwords and form content that the user has previously entered, such as credit card numbers or addresses. In the case of tracking sites, this can also store user location or user behaviour while navigating a webpage. Other data elements that can be used for tracking purposes may comprise any of: small data files, pieces of code, script files, text files used to store and transmit data to the tracking server. If cookies are blocked or rejected by the user device, then it may be very difficult for users to have their website logins remembered anywhere or for websites to keep track of shopping carts.

There are proposed herein methods and apparatus to protect a user privacy by controlling the type of data that is being sent to any tracking servers. This is done in a way that does not prevent websites from loading while at the same time reduces the risk of tracking servers gaining user specific data that can be correctly linked to the user.

In an embodiment, at least part of network traffic sent from the user device 1 is intercepted. The intercepted network traffic is analysed to identify any elements that are indicative of a website visitor tracking process. In the event that one or more elements indicative of the website visitor tracking process are identified, the one or more elements indicative of the website visitor tracking process are analysed to identify any tracking fields comprising user specific data. In the event that one or more tracking fields with user specific data are identified and prior to allowing the intercepted network traffic from the client device to continue, random tracking field data accepted by the website visitor tracking process is selected and the user specific data of the one or more tracking fields is replaced with the selected random tracking field data respectively.

Figure 2:
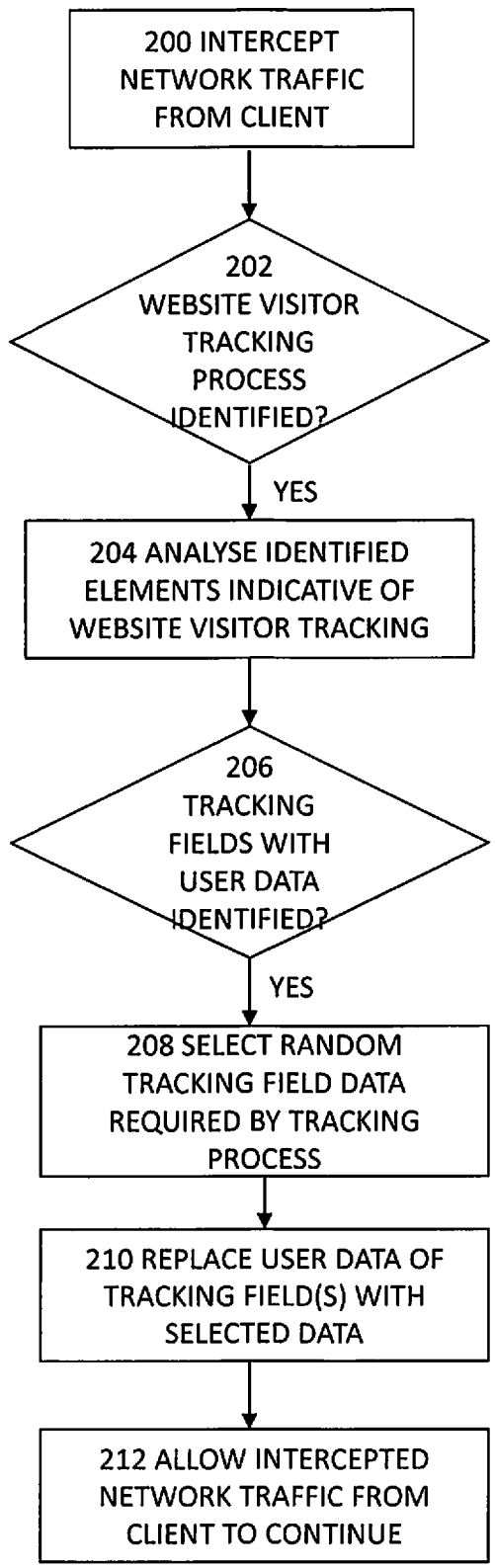
FIGS. 2 and 3 are flow diagrams showing exemplary steps.

FIG. 2 is a flow diagram that illustrates an example method. In step 200 network traffic from the user device 1 is intercepted. In an embodiment, there are predetermined rules on what network traffic to intercept and what network traffic is allowed through. In an embodiment, all traffic may already be passed via a virtual private network and it may be that all network traffic is intercepted. In another embodiment, most traffic can be allowed without intercepting, and the decision on whether there is a need to intercept the network traffic is made based on reputation rating of the target URL, for example. There may also be other predetermined rules as to which network traffic is intercepted.

In 202, the intercepted network traffic is analysed to identify any elements that are indicative of a website visitor tracking process. In an embodiment, the elements indicative of the website visitor tracking process are identified by querying uniform resource locator (URL) reputation from a URL reputation database, for example from the server 3, wherein the URL reputation database maintains data of tracking URLs. If any elements indicative of a website visitor tracking process are identified, then 204 is entered where the identified elements are further analysed to identify any tracking fields comprising user specific data. In an embodiment, the tracking fields comprising user specific data may comprise any of: a GET field, a cookie, an Etag value, or any predetermined field in the network traffic header. Tracking URLs evolve and there will always be new and even customized tracking fields that can appear in the header and those new tracking fields will then be added to the tracking fields to monitor as they are discovered. For example, it can be monitored whether the URL has any parameters in the GET field or is a cookie being submitted or is there an Etag value in the request. The user specific data may be any information that is related to the user and intended to be communicated over the communications/data network. The user specific data may be unique information that can be associated with a specific user device and/or user.

In 206, if one or more tracking fields with user specific data are identified, then 208 is entered where random tracking field data related to the identified one or more tracking fields and accepted/required by the website visitor tracking process is selected.

In an embodiment, the random tracking field data is selected from a pool client database that is a database of pool client information maintained at the server 3. In an embodiment, when any tracking field of the intercepted network traffic is found to qualify as tracking with potential user specific information, then the user specific data of this particular tracking field is added to the pool client database in a specific data pool that has the same tracking fields only with different information. The data pools of the pool client database are populated by the user device community to ensure that the data values for the tracking fields are real and valid.

In another embodiment, the random tracking field data accepted by the website visitor tracking process is generated at the server 3 and a data pool of random tracking field data is populated with the generated data. The generated random tracking field data is then selected from the data pool and the user specific data is replaced with the data from the data pool of generated tracking field data. The generated random tracking field data may be pre-generated dummy data instead of using data received from the user clients. This means that the actual user specific data may be swapped with the random (pre-generated) data from one or more dummy systems. The server backend systems may generate the random tracking field values that will be used to populate the data pool.

In another embodiment, the structure of the tracking field data accepted by the website visitor tracking process is pre-identified and the random tracking field data is generated in the event that one or more tracking fields with user specific data are identified and prior to allowing the intercepted network traffic from the client device to continue. Thus, the selected data may be randomized data generated on the fly, for example. In an example, the random data is generated for pre-defined tracking fields. In this case, there may not be any data pool that will be prepopulated but instead the structure of the values (cookies, URL parameters, etc.) are pre-identified and then certain user-specific values may be replaced with the randomized ones that are generated dynamically (on the fly).

In 210, the user specific data of the identified one or more tracking fields is replaced with the selected random tracking field data. In 212, the intercepted network traffic is allowed to continue, however, no user specific data of the user is allowed through since it has been replaced with the tracking field data that may be selected from the pool client database or from the data pool of generated tracking field data or be based on dynamically generated tracking field data.

Figure 3:
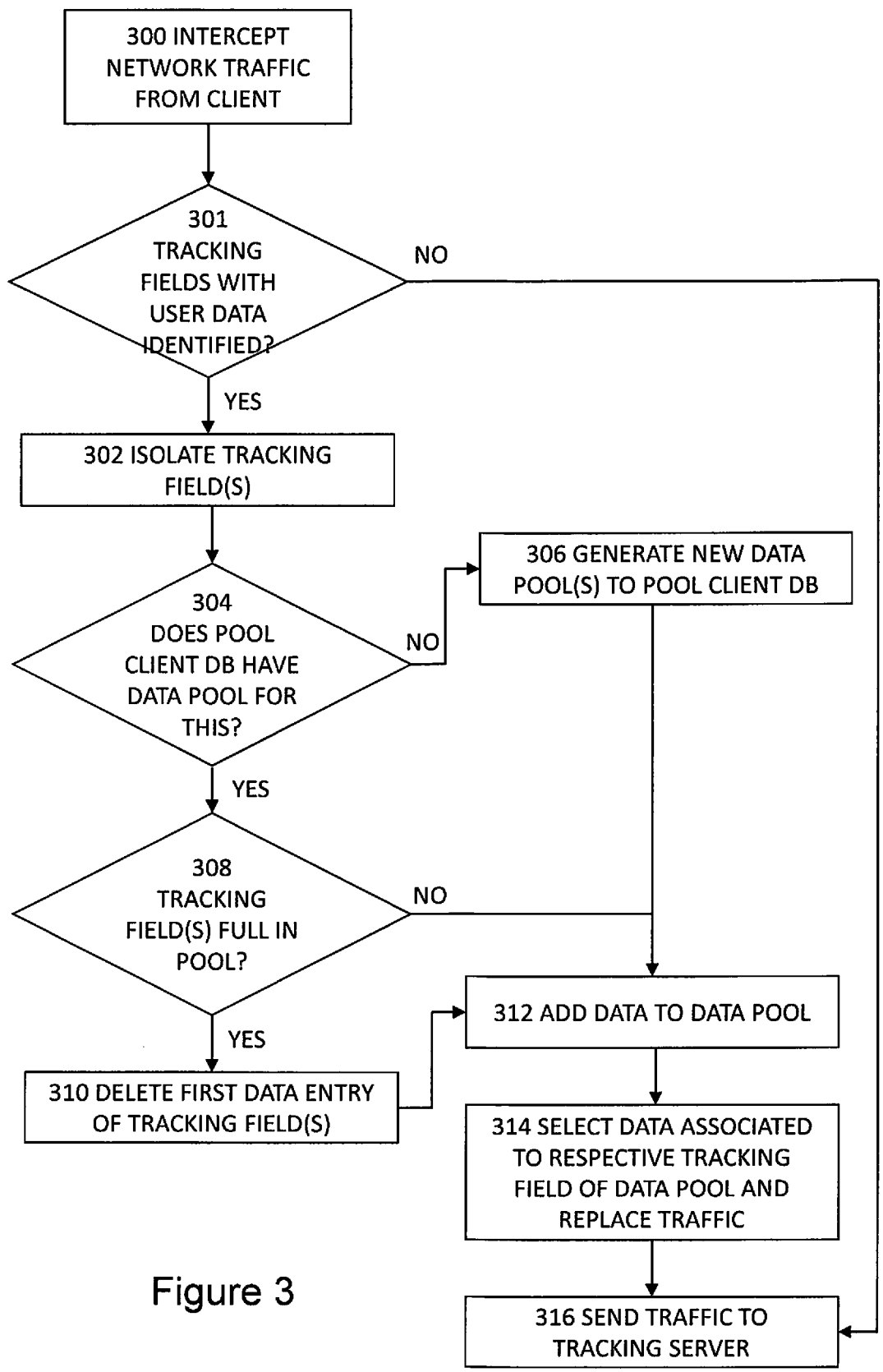

FIG. 3 is a flow diagram that illustrates another example method. In step 300, network traffic from the user device 1 is intercepted. In 301, if one or more tracking fields with user specific data are identified, then 302 is entered. If tracking fields with user specific data are not detected, then 316 is entered where the intercepted network traffic is allowed to continue.

In 302, the identified tracking fields are isolated for further analysis. In 304, a determination is made as to whether a data pool for the identified type of tracking field data in the pool client database exists already. If yes, then 308 is entered where a check is made whether any data entry fields in this data pool are full. In an embodiment, each data pool of the pool client database may have a predetermined maximum limit of data entries related to each data entry field. In an embodiment, the data pool may operate in a first in first out (FIFO) method for organizing and manipulating its data buffer, where the oldest (first) entry, or 'head' of the queue, is processed first. However, other methods to organize the data buffer can also be used, such as a priority queue or LIFO (last in first out). In this example, if a certain tracking field of the data pool is full (data entry maximum limit has been reached), then 310 is entered where the first data entry of the tracking field is deleted. If the tracking field of the data pool is not full, then 312 is entered where new tracking field data of the user device is added to the data pool.

In 304, if the pool client database does not have a corresponding data pool than that was identified in 302, 306 is entered where new data pool is generated to the pool client database. From 306 the process continues to 312 where tracking field data is added to the generated data pool. In an embodiment, when there is no corresponding data pool yet and the added data is the first of its kind, then the new data will be the only entry in the pool and as such may be selected to be sent to the tracking server. In this embodiment, the user's real information may thus get into the tracking server, however, this is only one piece of data from the user to the tracking server. Although many users will have their first time encounters with a particular tracking data, it is a very low probability that a single user would always be the first one to encounter a particular tracking data for the first time. Therefore the tracking server would still not have a very clear picture of the profile of one particular user if it only has very little real information about the user and the rest of the data is randomly selected from a pool that others have already populated in the first place. In this example approach, the bigger the pool, the more advantageous it is for the whole community.

In 314, tracking field data related to the identified one or more tracking fields are retrieved from the predetermined data pool of the pool client database. The user specific data of the identified one or more tracking fields is replaced with the tracking field data retrieved from the pool client database.

In 316, the intercepted network traffic is allowed to continue and traffic is sent to the tracking server with the replaced tracking field data instead of the user specific data of the user device. Before passing the network traffic to the tracking server the same tracking field with different data from the pool client database is used to replace the original data. In an embodiment, the non-tracking fields are not replaced from the original header. This ensures that the tracking server will be non-the-wiser since the profile they can create for the user will not be correct.

The method can be implemented in multiple different ways, depending on the desired level of precision. In an embodiment, all the fields of the URL can be added to the pool client database if the URL is already identified as a tracking URL. Then a data pool can be generated for all those tracking fields and they all can be considered as information that can be mixed up and swapped. In another embodiment, especially when the tracking servers get more advanced and give websites trouble in case we mix and match non-tracking fields, we can pre-identify this via a server/ORSP (object reputation service protocol) lookup. For example when the URL is already identified as tracking, a new ORSP functionality can be built such that when a certain query (i.e: return tracking fields) is send to ORSP, the query will return and identify if there is a tracking field in the query. Then only those fields are added to the pool client database. When the data pool already exists, and all the tracking fields can be found in the data pool, then there is necessarily no need to query the server anymore as to which fields should be considered.

In the below example it can be seen that the user specific data is parameters in the GET field and a cookie that is being sent to a tracking domain spring-tns.net. In this example, this traffic may be intercepted and the URL parameters and the cookie may be replaced with a randomly existing parameter and cookie values from the associated data pool.

Example where HTTP GET traffic to a tracking server contains parameter and cookie information:

GET http://xx.spring-tns.net/j0=...r=http%3A%2
Host: xx.spring-tns.net
User-Agent: Mozilla/5.0 (Windows NT 6.1; WOW64; rv:31
Accept: image/png,image/*;q=0.8,*/*;q=0.5
Accept-Language: en-US,en;Q=0.5
Accept-Encoding: gzip, deflate
Referer: http://www.xx/abs
Cookie: i00=3aa4525d19fc1d610000
Connection: keep-alive Table 1 below shows an example of a particular data pool having a maximum limit per field. In this example, the data pool operates in a FIFO fashion. This means that the fields are flushed out of the data pool either when the data pool is full or a new URL comes in for replacement.

TABLE 1

Example of xx.sping-tns.net data pool
Pool: xx.spring-tns.net (limit: 1000/field)

| Cookies | | Parameters | | | | |
|---|---|---|---|---|---|---|
| i00 | srp | j0 | R | cp | lt | X |
| 3aa4525 | d19fc1 3aa45 | d6 | x.com z.com a.com f.org | y.com | i6ktdha3 | 1600 × 900 800 × 600 |

Turning now to FIG. 4, there is shown an exemplary apparatus, such as a client device or a user device 1. A first transmitter 16 is provided that is arranged to send communication over the Internet or other network. A processor 15 is provided that is arranged to intercept at least part of network traffic that is to be transmitted from the user device 1.

In an embodiment, the processor 15 is arranged to analyse network traffic data of the intercepted network traffic to identify any elements indicative of a website visitor tracking process. However, in some embodiments, these analysis can also be implemented in the server system 3 or some other device external to the user device 1. In an embodiment, the processor 15 is arranged to identify the elements indicative of the website visitor tracking process by querying uniform resource locator (URL) reputation from a URL reputation database, wherein the URL reputation database maintains data of tracking URLs.

The processor 15 is further arranged to analyse the one or more elements indicative of the website visitor tracking process to identify any tracking fields comprising user specific data, in the event that one or more elements indicative of the website visitor tracking process are identified.

In the event that one or more tracking fields with user specific data are identified, the processor is arranged to select random tracking field data related to the one or more tracking fields and accepted by the website visitor tracking process. In an embodiment, the processor 15 may use a second transmitter 20 to transmit a request for the tracking field data to the server system 3. The first receiver 18 receives the tracking field data from the server system 3. In an embodiment, at least some tracking field data can also be stored locally in the memory 22 of the user device. In an embodiment, the processor 15 may first check whether the tracking field data can already be found in the memory 22 before sending the request to the server 3.

The processor is further arranged to replace the user specific data of the one or more tracking fields with the selected random tracking field data respectively prior to allowing the intercepted network traffic from the user device 1 to continue.

In an embodiment, the processor 15 is arranged to display a warning message at the user device 1 when the network traffic has been intercepted. In an embodiment, the processor 15 may, for example, identify the web resources that are requesting user specific data to the user via the display of the user device 1. In another embodiment, no warning messages are displayed and the process may continue on the background. It is also possible that the user may configure by himself/herself whether any warning messages will be displayed or not.

In an embodiment, the processor 15 is arranged to receive a user indication to allow sending user specific data to the web resource. The user indication can be received via a user input 25 of the user device 1. The user input 25 is used by the user to input information such as a selection of whether to add URL to a whitelist.

FIG. 5 shows an example of a server 3. The server 3 is provided with a first receiver 5 that receives a request for tracking field data from the user device 1. The request comprises necessary information required to understand what type of tracking field data related to this tracking URL is needed. The request comprises the user specific data the tracking URL is requesting from the user device 1. A processor 6 is provided to compare the received data with stored tracking field data if any. This may be done by querying a pool client database 7, for example. The database is shown in this example as being located at the server 3, but it will be appreciated that the server 3 could alternatively access a remote database. The pool client database 7 is a database of predetermined tracking field data collected from a set of pool client devices. The database 7 may also contain information relating to known URLs and reputation data thereof. There may also be one or more other databases such as a data pool of pregenerated tracking field data.

In an embodiment, the processor 6 may compare the received user specific tracking field data related to the URL to the data stored in the pool client database 7. In an embodiment, the processor 6 is configured to add the received user specific data of the user device 1 to a corresponding data pool of the pool client database 7. This is done for enabling other pool client devices of the set of pool client devices to replace their user specific data of one or more tracking fields with the added user specific data. The processor 6 is further configured to select corresponding tracking field data received from another pool client device earlier but having different content than that of the received user specific data from the user device 1. The selection can be made randomly among the stored tracking field data entries in the requested data pool. The selection of data from the requested data pool can also be made by using a FIFO or LIFO or any other method.

A first transmitter 8 is provided for sending, to the user device 1, a message comprising the selected tracking field data related to the requested URL.

In the above description, the server 3 is described as having different transmitters and receivers. It will be appreciated that these may be disposed in any suitable manner, for example in a single transmitter and receiver, a transceiver and so on. Similarly, a single processor 6 is described but it will be appreciated that the function of the processor may be performed by a single physical processor or by more than one processor.

The server 3 is also provided with a non-transitory computer readable medium in the form of a memory 12. The memory may be used to store a computer program 13 which, when executed by the processor 6, causes the processor 6 to perform the functions described above. Note that the computer program 13 may be provided from an external source 14 such as a carrier wave, a flash disk, a disk and so on.

In the above description, the user device 1 is described as having different transmitters and receivers. It will be appreciated that these may be disposed in any suitable manner, for example in a single transmitter and receiver, a transceiver and so on. Similarly, a single processor 15 is described but it will be appreciated that the function of the processor may be performed by a single physical processor or by more than one processor.

The user device 1 is also provided with a non-transitory computer readable medium in the form of a memory 22. The memory may be used to store a computer program 23 which, when executed by the processor 15, causes the processor 15 to perform the functions described above. Note that the computer program 23 may be provided from an external source such as a carrier wave, a flash disk, a disk and so on. A software application may also be implemented in use by code, stored in the hard disk drive, running on the processor.

Figure 6:
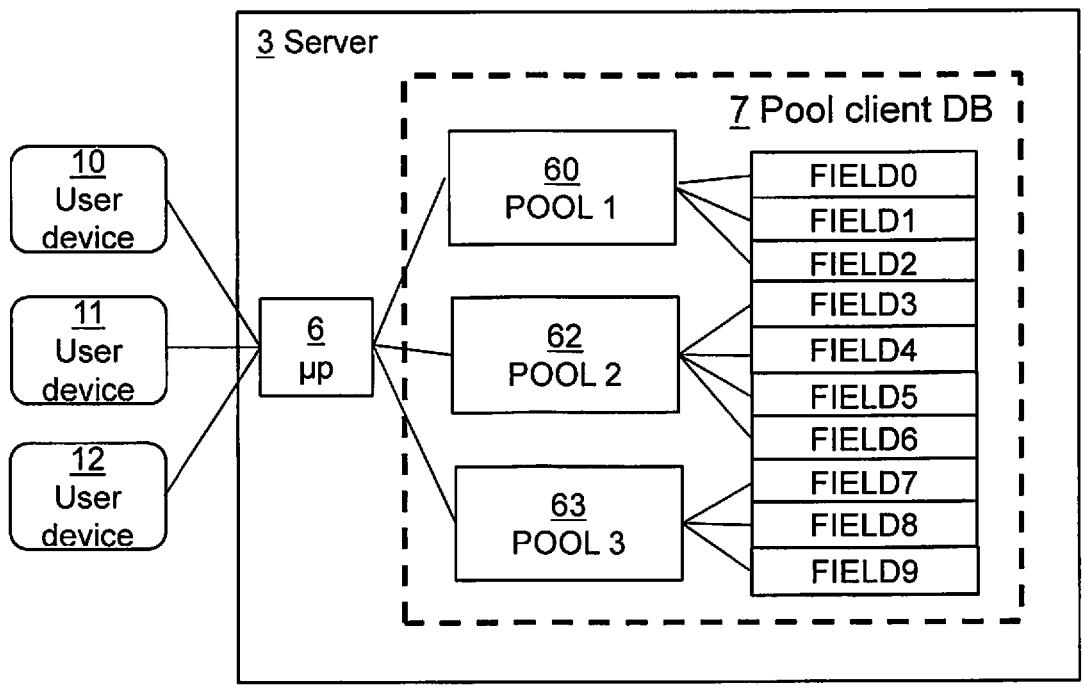
FIG. 6 illustrates an example of the apparatuses.

FIG. 6 is a simple example illustration of the server 3 and pool client devices 10, 11, 12. The server 3 maintains the pool client database 7.

When the processor 6 receives request from the pool client devices 10, 11, 12, it is configured to determine a correct data pool 60, 62, 63 in the pool client database 7 that is related to the request. In an embodiment, each data pool 60, 62, 63 is related to a certain tracking URL. The processor 6 is configured to store received tracking field data from the pool client devices 10, 11, 12 to the data pool 60, 62, 63. In an embodiment, a particular data pool 60, 62, 63 has a predetermined amount of tracking fields FIELD0-FIELD9. A data pool 60, 62, 63 may have a predetermined maximum limit per fields. The user specific, tracking related data received from the pool client devices 10, 11, 12 is stored to these tracking fields as entries. In an embodiment, it is also possible that a data pool 60, 62, 63 has fields for also other than tracking related data related to a certain tracking URL.

In an embodiment, all data fields related to a tracking URL can be added to the pool client database 7. In this case the data pool 60, 62, 63 can be generated for all those fields and they all can be considered as information that can be used to replace user specific data of a pool client device. In another embodiment, only those fields specifically identified as tracking fields are added to the pool client database.

In an embodiment, whenever the processor 6 determines that a certain tracking URL has no data pool 60, 62, 63 created, it is configured to generate a new data pool for this URL. In an embodiment, once a predetermined maximum limit of data pool field entries is reached, stored data of this field can be replaced with new data relating to this field.

In the example of FIG. 6, a pool client device 10 requests tracking field data related to a tracking URL. The processor 6 analyses the request and determines that a data pool related to this request is POOL 2, 62. The processor 6 then selects the requested tracking field data from the data fields of data pool POOL 2, 62. The processor 6 transmits the requested tracking field data, that is, the parameters fetched from fields FIELD3-FIELD6 for example. The processor 6 also stores new parameters received form the pool client device 10 to data pool 2, 62.

Figure 7:
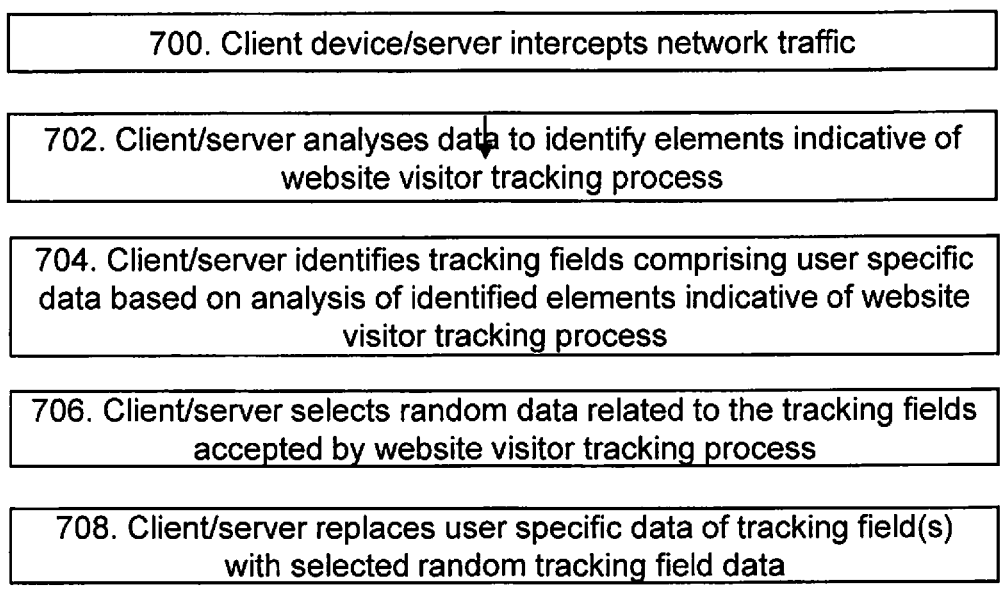
FIG. 7 is a flow diagram showing exemplary steps.

FIG. 7 is a flow diagram showing exemplary steps at the user device 1 and/or at the server 3. In an embodiment, at least some or even all of the method steps can be implemented either in the user device 1 or in the server 3.

700. The user device 1/server 3 intercepts network traffic.

702. The user device/server 3 analyses data to identify elements indicative of a website visitor tracking process.

704. The user device 1/server 3 identifies tracking fields comprising user specific data based on analysis of identified elements indicative of the website visitor tracking process.

706. The user device 1/server 3 selects random data related to the tracking fields that are accepted by the website visitor tracking process.

708. The user device 1/server 3 replaces the user specific data of tracking fields with the selected random data.

It will be appreciated by the person of skill in the art that various modifications may be made to the above described embodiment without departing from the scope of the present invention. For example, the database is described as being located at the server, but it will be apparent that the database may be located in a separate entity to the server, in which case the server will send queries remotely to the database.

The steps, points, signaling messages and related functions described above in relation to FIGS. 2 and 3 are in no absolute chronological order, and some of the steps may be performed simultaneously or in a different order. Other functions may also be executed between the steps or within the steps, and other signaling messages may be sent between the illustrated ones. Some of the steps can also be left out or replaced by a corresponding step. The system functions illustrate a procedure that may be implemented in one or more physical or logical entities.

The techniques described here may be implemented by various means. An apparatus or system that implements one or more of the described functions with an embodiment comprises not only existing means, but also means for implementing one or more functions of a corresponding apparatus that is described with an embodiment. An apparatus or system may also comprise separate means for each separate function. These techniques may be implemented in one or more modules of hardware or combinations thereof. For software, implementation can be through modules, for example, procedures and functions that perform the functions described here. The software code may be stored in any suitable data storage medium that is readable by processors, computers, memory units or articles of manufacture, and may be executed by one or more processors or computers. The data storage medium or memory unit may be implemented within the processor or computer, or as an external part of the processor or computer, in which case it can be connected to the processor or computer via various means known in the field.

The programming, such as executable code or instructions, electronic data, databases or other digital information can be stored into memories and may include a processor-usable medium. A processor-usable medium may be embodied in any computer program product or an article of manufacture which can contain, store, or maintain programming, data or digital information for use by or in connection with an instruction execution system, including the processor in the exemplary embodiment.

An embodiment provides a computer program product that comprises a computer-readable medium bearing a computer program code that is embodied therein for use with a computer. The computer program code comprises a code for intercepting at least part of network traffic from a client device, a code for analysing network traffic data of the intercepted network traffic to identify any elements indicative of a website visitor tracking process, a code for analysing the one or more elements indicative of the website visitor tracking process to identify any tracking fields comprising user specific data, and a code for selecting random tracking field data accepted by the website visitor tracking process and a code for replacing the user specific data of the one or more tracking fields with the selected random tracking field data respectively.

Embodiments of the present invention may be implemented in software, hardware, application logic or a combination of these. In an example of an embodiment, the application logic, software or a set of instructions is maintained on any conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

The various aspects of the invention are not limited to the combinations explicitly set out in the independent claims. Other aspects of the invention may comprise combinations of features from the described embodiments, the dependent claims and the independent claims.

It is obvious to a person skilled in the field that, as the technology advances, the inventive concept can be implemented in various ways. The invention and its embodiments are not limited to the examples described above but may vary within the scope of the claims.

The invention claimed is:

1. A method for privacy protection comprising, at an apparatus:
   intercepting at least part of network traffic from a client device;
   analysing network traffic data of the intercepted network traffic to identify one or more elements indicative of a website visitor tracking process;
   analysing the one or more elements indicative of the website visitor tracking process to identify one or more tracking fields comprising user specific data; and
   prior to allowing the intercepted network traffic from the client device to continue, randomly selecting tracking field data unrelated to the user specific data and known to be accepted by the website visitor tracking process and replacing, in the intercepted network traffic from the client device, the user specific data of the one or more tracking fields with the randomly selected tracking field data unrelated to the user specific data respectively,
wherein the randomly selecting includes selecting the tracking field data at random from a data pool.

2. The method according to claim 1, wherein analysing the network traffic data of the intercepted network traffic to identify any elements indicative of the website visitor tracking process further comprises: identifying the elements indicative of the website visitor tracking process by querying uniform resource locator (URL) reputation from a URL reputation database, wherein the URL reputation database maintains data of tracking URLs.

3. The method according to claim 1, wherein the one or more tracking fields comprising user specific data comprise any of: a GET field, a cookie, an Etag value, or any predetermined field in the network traffic header.

4. The method according to claim 1, further comprising maintaining, at a server system, a pool client database of predetermined data pools having tracking field data collected from the set of pool client devices, the predetermined data pools including the data pool,
wherein the randomly selecting includes selecting the tracking field data from the pool client database and replacing the user specific data of the one or more tracking fields with the retrieved tracking field data respectively.

5. The method according to claim 4, further comprising receiving the tracking field data from the set of pool client devices and storing the received tracking field data to a corresponding data pool of the pool client database.

6. The method according to claim 1, further comprising:
generating the tracking field data accepted by the website visitor tracking process at a server system; and
populating said generated tracking field data into the data pool,
wherein the randomly selecting includes randomly selecting said generated tracking field data from the data pool, and
wherein the replacing the user specific data includes replacing the user specific data with said generated tracking field data.

7. The method according to claim 1, further comprising:
pre-identifying the structure of the tracking field data accepted by the website visitor tracking process; and
generating the tracking field data accepted by the website visitor tracking process in the event that one or more tracking fields with user specific data are identified, prior to allowing the intercepted network traffic from the client device to continue.

8. An apparatus for use in a communications network, the apparatus comprising:
a processor arranged to intercept at least part of network traffic from a client device used in the communications network;
a processor arranged to analyse network traffic data of the intercepted network traffic to identify one or more elements indicative of a website visitor tracking process;
a processor arranged to analyse the one or more elements indicative of the website visitor tracking process to identify one or more tracking fields comprising user specific data; and
a processor arranged to randomly select tracking field data unrelated to the user specific data and known to be accepted by the website visitor tracking process and to replace, in the intercepted network traffic from the client device, the user specific data of the one or more tracking fields with the randomly selected tracking field data unrelated to the user specific data respectively, prior to allowing the intercepted network traffic from the client device to continue,
wherein the randomly selecting includes selecting the tracking field data at random from a data pool.

9. The apparatus according to claim 8, wherein the processor is further arranged to identify the elements indicative of the website visitor tracking process by querying uniform resource locator (URL) reputation from a URL reputation database, wherein the URL reputation database maintains data of tracking URLs.

10. The apparatus according to claim 8, wherein the one or more tracking fields comprising user specific data comprise any of: a GET field, a cookie, an Etag value, or any predetermined field in the network traffic header.

11. The apparatus according to claim 8, further comprising a transmitter for sending the tracking field data of the tracking fields comprising user specific data to a pool client database for storing the tracking field data to a corresponding data pool of the pool client database.

12. The apparatus according to claim 8, wherein at least part of the processors reside in the client device and at least part of the processors reside in a server system, the server system maintaining a pool client database for a set of pool client devices in the communications network.

13. The apparatus according to claim 8, further comprising a processor maintaining a pool client database of predetermined data pools having tracking field data collected from a set of pool client devices.

14. A computer program product, comprising a non-transitory computer readable medium having stored thereon computer readable code which, when executed by a computer, causes a computer to perform a method comprising:
intercepting at least part of network traffic from a client device;
analysing network traffic data of the intercepted network traffic to identify one or more elements indicative of a website visitor tracking process;
analysing the one or more elements indicative of the website visitor tracking process to identify one or more tracking fields comprising user specific data; and
prior to allowing the intercepted network traffic from the client device to continue, randomly selecting tracking field data unrelated to the user specific data and known to be accepted by the website visitor tracking process and replacing, in the intercepted network traffic from the client device, the user specific data of the one or more tracking fields with the randomly selected tracking field data unrelated to the user specific data respectively,
wherein the randomly selecting includes selecting the tracking field data at random from a data pool.

* * * * *